(12) United States Patent
Cao et al.

(10) Patent No.: US 10,762,087 B2
(45) Date of Patent: Sep. 1, 2020

(54) DATABASE SEARCH

(71) Applicant: EMC Corporation, Hopkinton, MA (US)

(72) Inventors: Yu Cao, Beijing (CN); Baoyao Zhou, Beijing (CN); Qiyan Chen, Shanghai (CN); Bo Chen, Shanghai (CN); Yuxi Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/211,574

(22) Filed: Mar. 14, 2014

(65) Prior Publication Data

US 2014/0280159 A1 Sep. 18, 2014

(30) Foreign Application Priority Data

Mar. 15, 2013 (CN) .......................... 2013 1 0095688

(51) Int. Cl.
*G06F 17/00* (2019.01)
*G06F 16/2455* (2019.01)

(52) U.S. Cl.
CPC ................................ *G06F 16/2456* (2019.01)

(58) Field of Classification Search
CPC .. G06F 19/322; G06F 19/328; G06F 19/3418; G06F 19/3431; G06F 19/345; G06F 19/3487
See application file for complete search history.

(56) References Cited

U.S. PATENT DOCUMENTS

| | | | | |
|---|---|---|---|---|
| 6,493,717 B1 * | 12/2002 | Junkin | ................... | G06F 16/972 707/754 |
| 8,615,526 B2 * | 12/2013 | Sinha | ....................... | G06F 16/86 707/779 |
| 2004/0036719 A1 * | 2/2004 | Van Treeck | .............. | G06F 9/451 715/763 |
| 2011/0191407 A1 * | 8/2011 | Fu | .............................. | G06F 8/38 709/203 |
| 2012/0016901 A1 * | 1/2012 | Agarwal | ............ | G06F 17/30569 707/769 |

OTHER PUBLICATIONS

Chinese Search Report for Parent CN Application CN201310095688.1.
Translated CN201310095688.1 Allowed Claims.
CN201310095688.1 Notice of Allowance.

* cited by examiner

*Primary Examiner* — Truong V Vo
(74) *Attorney, Agent, or Firm* — Krishnendu Gupta (57) ABSTRACT

The present disclosure provides a method and apparatus for database search, by grouping data entries based on join conditions between the data entries as set in search conditions; and executing the search based on the grouping of the data entries, and can efficiently and effectively resolve the issues that are common to the existing MapReduce query processing systems, thereby being particularly suitable for big dataset analytics in a large cluster system.

20 Claims, 6 Drawing Sheets

Fig. 6

DATABASE SEARCH

RELATED APPLICATION

This Application claims priority from Chinese Patent Application Serial No. CN201310095688.1 filed on Mar. 15, 2013 entitled "Method and Apparatus for Database Search," the content and teachings of which are hereby incorporated by reference in their entirety.

BACKGROUND

Embodiments of the present invention relate to the field of databases, and more specifically, for searching/querying a database.

With the constant development and improvements of database technology, requirements for database search/query techniques also get increasingly demanding. In practice, the MapReduce framework has been widely recognized as an efficient approach for big data analytics in a large cluster system. MapReduce application development requires the developers to code the application logic into the simple interfaces exposed by MapReduce (i.e. the map and reduce functions). Although such map and reduce interfaces offer extremely high programming flexibility, they often become challenging to implement, optimize and maintain, especially for non-trivial and complex data analysis tasks that are involved in practical productions. As is evident from the success of relational database technology (i.e. SQL), program development and optimization would be more efficient and effective if data processing programs were written in a declarative query language that hides the implementation details and is amenable to optimization. In this case, users can directly write declarative queries, which are then translated into a sequence of MapReduce programs (jobs) to be executed by the MapReduce platform (e.g. Hadoop).

In recent times, several declarative languages have been proposed and integrated into MapReduce-based systems, such as Pig Latin/Pig, HiveQL/Hive. In these systems, users directly write declarative queries, which are then translated into a sequence of MapReduce programs (jobs) to be executed by the MapReduce platform (e.g. Hadoop). These languages have significantly improved the productivity of MapReduce application developers. However, their effects and impact are limited by two major issues. On one hand, till date only few specialized optimization techniques have been exploited during the query translation procedure. As a result, in practice it is observed that automatically translated MapReduce programs for many queries are often extremely inefficient compared to hand-optimized programs that are written by experienced programmers. For example, existing language translators take the local one-operation-to-one-job approach, which simply replaces each operation in the query graph with a prepared MapReduce program. On the other hand, existing MapReduce languages provide a limited syntax for operating on data collections, mainly in the form of well-known relational joins and group-bys. As such, these languages enable users to plug-in custom MapReduce scripts into their queries. This actually nullifies the benefits of using a declarative language and may result in sub-optimal, error-prone and hard-to-maintain code.

SUMMARY

To solve the above problems in the prior art, this specification proposes solutions as below:

According to embodiments of the present invention, there is proposed an apparatus, a computer program product and a method for database search, by grouping data entries based on join conditions between the data entries as set in search conditions; and executing the search based on the grouping of the data entries.

In an optional embodiment of the present invention, the grouping data entries based on join conditions between the data entries as set in search conditions further comprises the step of transforming the search conditions by at least one of: removing patterns from the search conditions, rewriting rules, and eliminating nests.

In an optional embodiment of the present invention, the grouping is implemented further based on dependences between values of the data entries as set in the search conditions. In an optional embodiment of the present invention, the search conditions comprise an SQL query statement.

In an optional embodiment of the present invention, types of the data entries in the database comprise one of: record type <A1: t1, . . . , An:tn>, sequence type [t], set type {t}, and map type {(t1, t2)}; where n is a natural number, t, t1, . . . , tn are recursively defined types, A1, . . . , An are component names, and map type {(t1, t2)} binds keys of type t1 to values of type t2.

In an optional embodiment of the present invention, the SQL query statement comprises the following forms:

SELECT [DISTINCT] $e_s$
FROM $p_{f1}$ in $e_{f1}$, ..., $p_{fn}$ in $e_{fn}$
[WHERE $e_w$]
[GROUP BY $p_g$ : $e_g$ [HAVING $e_h$]]
[ORDER BY $e_o$]

where statements in [ ] are optional statements. In addition, $e_{f1}, \ldots, e_{fn}, e_s, e_w, e_g$ and $e_o$ are arbitrary expressions. In the FROM clause each of $p_{f1} \ldots p_{fn}$ is a pattern, each of $e_{f1} \ldots e_{fn}$ is an expression that returns a sequence, a set or a map of key-value. The form "p in e" indicates that the pattern p matches every element in e with its pattern variables being bound to respective values in the elements. The form $p_g:e_g$ in the GROUP BY clause indicates that the query results are partitioned into groups so that the members of each group have the same value $e_g$, and the pattern $p_g$ is bound to the GROUP BY value that is common across each group.

In an optional embodiment of the present invention, executing the search based on the grouping of the data entries further has one or more of: setting a new query variable for associating to each SELECT expression in the query statement; removing all the join and filter predicates from the SQL query statement; and replacing the FROM part of each SELECT expression with a single binding that uses a tuple pattern to bind the query variables of directly nested SELECT expressions and variables of FROM part.

In an optional embodiment of the present invention, the search is implemented in parallel based on a MapReduce approach. In an optional embodiment of the present invention, when there is more than one MapReduce approach for the search, the cost of every MapReduce approach is evaluated and a MapReduce approach with the minimum cost is selected as an actual search way.

In an optional embodiment of the present invention, the MapReduce approach comprises one or more of: reducing I/O costs of reading input data and writing output data by MapReduce jobs; combining a plurality of MapReduce jobs that are independent of each other into a single MapReduce job; and combining the pairs of product-consumer MapReduce jobs if at least one job of them is Map-only or both jobs share a same Map key.

In an optional embodiment of the present invention, the MapReduce approach comprises an execution approach in the following form:

REPEAT v=e STEP body [limit n]

Where v is a repetition variable, the type of e is a set $\{T\}$ for a certain type T, the type of body is $\{(T, bool)\}$, and n is a natural number. And where the REPEAT statement indicates that first v is bound to the value of e, then body is calculated repeatedly, and a new value is assigned to v from the previous repetition. The execution stops if either the number of repetitions becomes n or when all the Booleans returned by body are false.

According to an additional embodiment of the present invention, the apparatus for database search, has a grouping module configured to group data entries based on join conditions between the data entries as set in search conditions; and an executing module configured to execute the search based on the groups of the data entries. The grouping module further comprises at least one of the followings to transform the search conditions: a pattern removing module configured to remove patterns from the search conditions; a query simplifying module configured to rewrite rules; and a nest eliminating module configured to eliminate nests, and the grouping module is further configured to implement the grouping based on dependences between values of the data entries as set in the search conditions.

The apparatus further has an executing module that has one or more of: a new variable setting module configured to set a new query variable for associating to each SELECT expression in the query statement; a removing module configured to remove all the join and filter predicates from the SQL query statement; and a replacing module configured to replace the FROM part of each SELECT expression with a single binding that uses a tuple pattern to bind the query variables of directly nested SELECT expressions and variables of FROM part. The executing module conducts the search in parallel based on a MapReduce approach.

The apparatus for database search further has an evaluating-selecting module configured to, when there is more than one MapReduce approach for the search, evaluate the cost of every MapReduce approach and select a MapReduce approach with the minimum cost as an actual search way.

The executing module further has one or more of: a job compressing module configured to reduce I/O costs of reading input data and writing output data by MapReduce jobs; a horizontal combining module configured to combine a plurality of MapReduce jobs that are independent of each other into a single MapReduce job; and a vertical combining module configured to combine the pairs of product-consumer MapReduce jobs if at least one job of them is Map-only or both jobs share a same Map key.

By means of the above mentioned embodiments of the present invention, it is possible to allow SQL nested queries and user-defined functions (UDF) anywhere, allow operations over the grouped data, support custom filters/aggregations as UDFs and support declarative recursions. In addition, a query optimization framework provided according to the embodiments of the present invention efficiently transforms declarative queries written with the extended-SQL to optimal flows of MapReduce jobs.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention, wherein like reference numerals denote the same or similar elements through the figures. In the drawings.

DETAILED DESCRIPTION

Firstly, the existing SQL data model is extended in order to leverage characteristics of SQL more sufficiently and flexibly and illustrate the various embodiments of the present invention more clearly. For example, the data model of SQL is extended with the following additional types, besides the basic types (bool, int, string, etc.) and tuple (t1, . . . , tn):

record: < A1 : t1, ..., An: tn >;
sequence: [t];
set: {t};
map: {(t1, t2)};

where t1, t2, . . . , tn are (recursively defined) types and A1, . . . , An are component names. A map $\{(t1, t2)\}$ binds keys of type t1 to values of type t2.

Those skilled in the art should understand that the data model of SQL is extended for making sufficient use extensively of characteristics of SWL rather than limiting the various embodiment of the present invention. In fact, the basic data model of SQL is completely suitable for the various embodiments of the present invention.

Thus, in an embodiment of the present invention, an SQL query may be extended as follows:

SELECT [DISTINCT] $e_s$
FROM $p_{f1}$ in $e_{f1}$, ..., $p_{fn}$ in $e_{fn}$
[WHERE $e_w$][GROUP BY $p_g$ : $e_g$ [HAVING $e_h$]]
[ORDER BY $e_o$]

As is clear to those skilled in the art, statements in [ ] are optional statements. In addition, $e_{f1}, \ldots, e_{fn}, e_s, e_w, e_g$ and $e_o$ are arbitrary expressions, which may contain other nested SELECT-queries. The FROM clause contains query bindings of the form "p in e", where p is a pattern and e is an expression that returns a collection (i.e. sequence, set or key-value pair map). The pattern p matches every element in the collection e with its pattern variables being bound to the corresponding values in the element. In other words, this query binding specifies an iteration over the collection e (one element at a time), causing the pattern p to be matched with the current collection element. For example, the following query iterates over Employees, and for each employee record, it matches the record with the pattern <name:n, manager:m>, which binds the variables n and m to the record components name and manager respectively, and ignores the rest.

SELECT (n, mn)
FROM <name:n, manager:m> in Employees, <name:mn> in m

The GROUP BY clause takes the form p:e to partition the query results into groups so that the members of each group have the same value e. The pattern p is bound to the GROUP BY value that is common across each group. As a result, the GROUP BY operation lifts all non-GROUP BY pattern variables that are defined in the FROM clause, from type T to a set {T}, indicating that each such variable must contain multiple values, one for each member of the group.

The ORDER BY cause sorts the result of a query after the optional GROUP BY by the $e_o$ values.

With the aforementioned extended-SQL, it is possible to declaratively express any arbitrary MapReduce job as will be shown later.

Generally, a MapReduce job transforms a dataset s of type $\{\alpha\}$ into a dataset of type $\{\beta\}$ using a map function m and a reduce function r with types:

m: $\alpha = \{\kappa, \gamma\}$ r: $(\kappa, \{\gamma\}) = \{\beta\}$ for the arbitrary types $\alpha$, $\beta$, $\gamma$ and $\kappa$. The map function m transforms values of type $\alpha$ from the input dataset into a set of intermediate key-value pairs of type $\{(\kappa, \gamma)\}$. The reduce function r merges all intermediate pairs associated with the same key of type $\kappa$ and produces a set of values of type $\beta$, which are incorporated into the MapReduce result. The above MapReduce job is equivalent to

```
SELECT w
FROM z in (SELECT r(key, y)
           FROM x in s, (k, y) in m(x)
           GROUP BY key : k), w in z
```

The above equivalence shows that extensions to SQL as made in the present disclosure make the resulting extended-SQL computationally complete.

Graph algorithms, such as PageRank, require repetitive applications of MapReduce jobs that can be expressed as transitive closures or recursion. In the embodiments of the present invention, such a repetition may be formulated with the form:

REPEAT v=e STEP body [limit n]

where v is a repetition variable. The type of e must be a set {T} for a certain type T, and the type of body must be {(T, bool)}, n being a natural number. This expression first binds v to the value of e and then it evaluates the body repeatedly and assigns a new value to v from the previous repetition. REPEAT execution is stopped if either the number of repetitions becomes n or when all the booleans returned by body are false.

Extensions to the data model of SQL have been illustrated above. With the extended-SQL query, embodiments of the present invention is capable of handling deeply (extremely complex) nested queries, of any form and at any nesting level, and converting them to join plans. It can also handle dependent joins, which are used when traversing nested collections. It should be noted, however, that SQL is extended only for leveraging characteristics of the SQL model more sufficiently, efficiently and flexibly, rather than limiting the present disclosure. An SQL model that has not been extended as such is completely suitable for the various embodiments of the present invention.

The principles and spirit of the present invention will be described with reference to some exemplary embodiments that are shown in the accompanying drawings. It is to be understood that these embodiments are provided only for enabling those skilled in the art to better understand and further implement the present invention, rather than limiting the scope of the present disclosure in any fashion.

Figure 1:
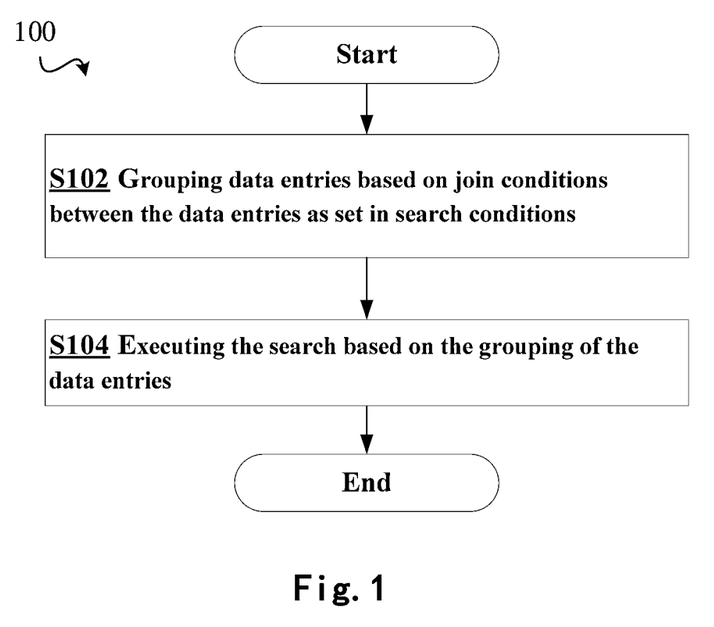
FIG. 1 shows an exemplary flowchart of a method 100 for database search according to one embodiment of the present invention.

FIG. 1 shows an exemplary flowchart of a method 100 for database search according to an embodiment of the present invention. After method 100 starts, the flow first proceeds to step S102 where data entries are grouped based on join conditions between the data entries as set forth in search conditions. Typically, the so-called search conditions here may include, without limitation to, a conventional SQL query statement. For example, the aforementioned extended-SQL statement (also referred to as analogous-SQL statement) is also suitable for this implementation. In addition, the term "join" refers to database join operations that are well known to those skilled in the art.

With respect to the inputted search condition (e.g. defined with the extended-SQL statement), step S102 may transform the search condition into joins and unnests to process the input data and to group these data so that all data in a group satisfy the join conditions. In a preferred but not essential implementation, step S102 may include the step of transforming (simplifying) the search conditions by at least one of: compiling away patterns from the search conditions, simplifying a query, and eliminating nests. Specifically, the pattern removal is done, for example, by assigning a fresh variable to a top-level pattern and by expressing the pattern variables in terms of a new variable. Query simplification is done, for example, by rewrite rules, such as when a field selection is applied to a record construction, it is normalized to the selected record component. One example of query unnesting is when the inner query does not depend on the outer query, it can be pulled out from the outer query.

For example, consider an SQL query (1) extended as below

Figure 2:
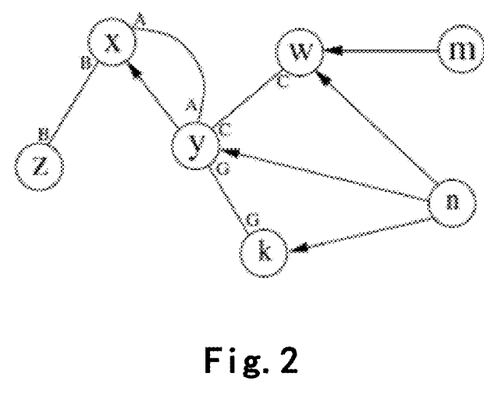
FIG. 2 shows an exemplary query graph generated with respect to a specific example according to one embodiment of the present invention.

```
select f(select h(z) from z in Z where z.B=x.B)
from x in X, y in x.D
where x.A=y.A
and p(select q(w.n)
       from w in W,
       n in g(select w.M+k.N
              from k in K
              where k.G=y.G )
       where w.C=y.C and c(select m.F from m in w.E))
```

Arbitrary code is specified for the invocation of functions f, h, p, q, g and c, and seven variables x, y, z, w, n, m and k are bound within the five SELECT expressions in the query.

The query (1) may be represented in terms of a query graph as shown in FIG. 2, based on the join conditions of the query variables set in the query (1) and additionally based on dependencies (dependence) between the variables. In FIG. 2, each of nodes x, y, z, w, k, n and m represents a query variable, undirected joins between nodes represent equivalent join relationships (i.e. join conditions, such as the join condition "x.A=y.A" between x and y in this example) between variables such as f(v)=g(w) and the like, and directed joins between nodes represent dependences between variables, for example, f(v)/g(v) depending on v/w respectively (for example, in this case,

```
n in g(select w.M+k.N
       from k in K
            where k.G=y.G )
``` represents that a variable n selected from a function g(w, k, y) has dependences with variables w, k and y respectively). The query graph shown in FIG. 2 represents all potential joins and unnests in the query concisely.

Next, method 100 proceeds to step S104 where the search is implemented based on the grouping of the data entries. In the implementation of step S104, the constructed grouped data may be processed by constructing query headers, and the query result is returned. Specifically, in one implementation, step S104 may derive the query header from the query so as to perform the search by: setting a new query variable for associating to each SELECT expression in the query; removing all the join and filter predicates from the SQL query statement; and replacing the FROM part of each SELECT expression with a single binding that uses a tuple pattern to bind the query variables of directly nested SELECT expressions and variables of FROM part. Optionally, the grouped data fed to the query header may be generated by a join/unnest graph, which may be derived from the query graph.

Considering for example the above extended-SQL query (1), two query headers may be generated as below:

```
Header 1: select f(select h(z) from z in zs)
          From (x,y,zs,ws) in s
          Where p(select q(w,n)
                  From (w,ms) in ws
                  Where c(select m.F from m. ms))
Header 2: g(select w.M+k.N from k in ks)
```

Where zs, ws, ms and ks each are a new query variable which is associated with each select-expression in the original query and from which all the join and filter predicates have been removed, and the FROM part of each SELECT expression is replaced with a single binding that uses a tuple pattern to bind the query variables of directly nested select-expressions and variables of FROM part.

The header 1 and the header 2, after being obtained, may be used to process the constructed grouped data and return the query result.
Method 100 ends.

During the implementation, the search in step S104 may be implemented in parallel based on a MapReduce approach. In a circumstance where there is more than one MapReduce approach, preferably the cost of every MapReduce approach is evaluated, and a MapReduce approach having the least or minimum cost is selected as an actual search way. For example, a cost model may be applied to estimate their costs, and then the cheapest cost model is selected.

In the implementation of the embodiments of the present invention, MapReduce jobs are directly implementable by core physical operators, including MapReduce, projection, filtering, aggregation, sorting, joins (broadcast join, remote lookup join, distributed sort-merge join, distributed hash join), repeat (for supporting the above repetition syntax), etc. These physical operators are the building blocks of physical plans. Those skilled in the art should be clear about various implementations of MapReduce, which are not detailed here.

Figure 3:
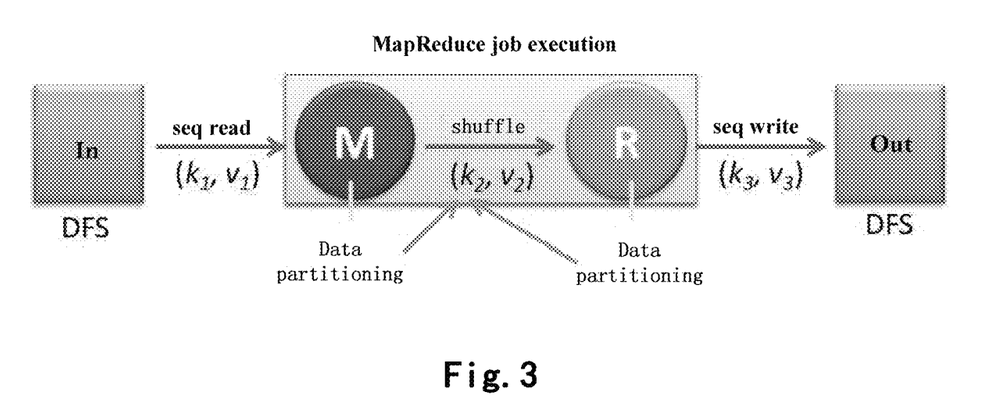
FIG. 3 shows an exemplary computation flow of a MapReduce job.

Note the enumeration of alternative physical plans can be conducted with technologies from traditional database systems, which however should take into consideration the unique properties of MapReduce offering new optimization opportunities and also permitting extra physical plans. For example, the present disclosure identifies three optimization techniques which can be used to reduce the number of MapReduce jobs required to calculate a specific extended-SQL query. Such reduction on the number of MapReduce jobs can avoid partial I/O costs of reading input data from and writing output data to the underlying distributed file system by the MapReduce jobs, and thus becomes beneficial. FIG. 3 shows the computation flow of a MapReduce job, where a (k, v) pair represents a key/value pair in the MapReduce process. In the computation, costs of the MapReduce approach may be optimized as detailed below:

1. MapReduce Job Compression: when the job input is essentially partitioned by k2, reduce computation can be moved into mappers.
2. Horizontal MapReduce Job Combination: any set of MapReduce jobs that are independent of each other within the workflow can be combined into a single MapReduce job. The job combination may further enable the beneficial sharing of input scan, map output and map function computation.
3. Vertical MapReduce Job Combination: a pair of product-consumer MapReduce jobs can be combined if at least one job is Map-only or both jobs share the same k2.

The cost model of the optimizer of the present disclosure can be easily built on top of a MapReduce performance model, which predicts the execution costs of single MapReduce job or workflows. This MapReduce performance model can be analytical, by first splitting the MapReduce job execution into multiple phases, then formulating the cost information of each phase and finally calculating the total cost via some sophisticated mathematical combination of the phase costs; or it can be statistics-driven, by using machine learning models with statistics about the input data sets (e.g., tuple size, cardinality) and historical information about prior query executions (e.g., execution time).

Figure 4:
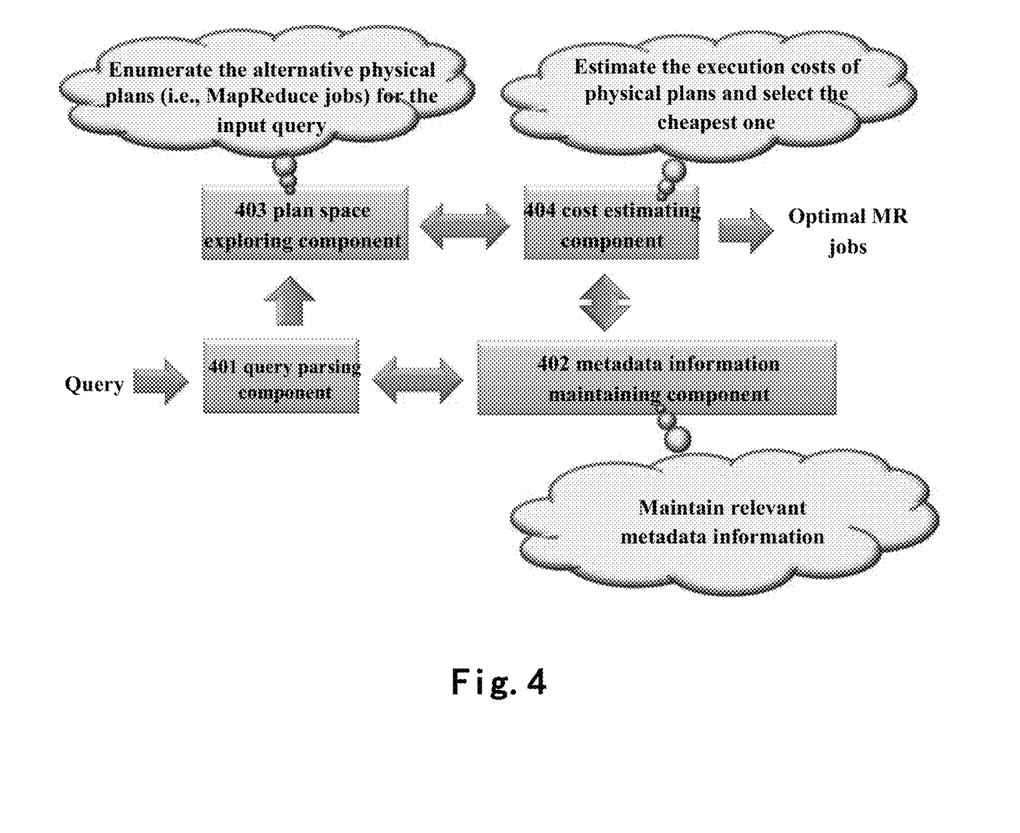
FIG. 4 shows an exemplary architecture 400 of a query optimizer according to an embodiment of the present invention.

FIG. 4 shows an exemplary architecture 400 of a query optimizer of the present disclosure, where a query parsing component 401 completes the steps of simplifying the search conditions, generating a query graph and generating a query header as described previously; a metadata information maintaining component 402 is responsible for maintaining relevant metadata information and providing the information to the query parsing component 401; a plan space exploring component 403 implements the step of enumerating the alternative physical plans (i.e. MapReduce jobs) for the input query; and a cost estimating component 404 estimates the execution costs of physical plans and selects the cheapest one as the optimal MapReduce job output.

Figure 5:
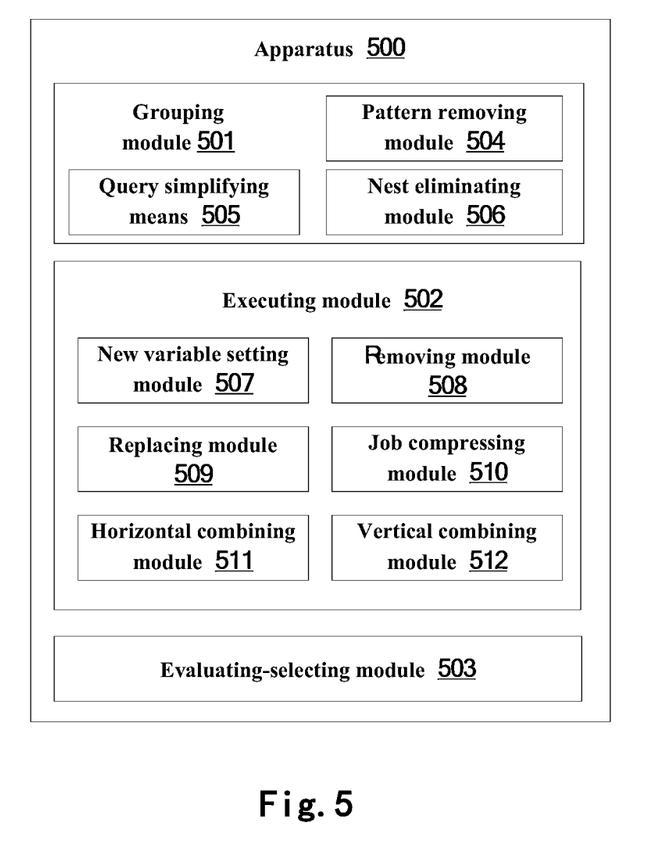
FIG. 5 shows an apparatus diagram 500 for database search according to one exemplary embodiment of the present invention.

Next with reference to FIG. 5, further description is presented to an exemplary apparatus diagram 500 for database search according to one exemplary embodiment of the present invention.

As shown in FIG. 5, apparatus 500 comprises a grouping module 501 and an executing module 502, wherein the grouping module 501 is configured to group data entries based on join conditions between the data entries as set in search conditions; and the executing module 502 is configured to execute the search based on the grouping of the data entries. It should be noted that each of these modules (disclosed above and those reference below) may exist separately or may be combined into a single module, wherein the single module performs the tasks of the individual modules together.

In an optional embodiment of the present invention, the grouping module 501 further comprises at least one of the followings to transform the search conditions: a pattern removing module 504 configured to remove patterns from the search conditions; a query simplifying module 505 configured to rewrite rules; and a nest eliminating module 506 configured to eliminate nests.

In an optional embodiment of the present invention, the grouping module is further configured to implement the grouping based on dependences between values of the data entries as set in the search conditions.

In an optional embodiment of the present invention, the search conditions comprise an SQL query statement.

In an optional embodiment of the present invention, types of the data entries in the database comprise one of: record type <A1:t1, . . . , An:tn>, sequence type [t], set type {t}, and map type {(t1, t2)}; where n is a natural number, t, t1, . . . , tn are recursively defined types, A1, . . . , An are component names, and map type {(t1, t2)} binds keys of type t1 to values of type t2.

In an optional embodiment of the present invention, the SQL query statement may comprise the following forms:

SELECT [DISTINCT] $e_s$
FROM $p_{f1}$ in $e_{f1}$, ..., $p_{fn}$ in $e_{fn}$
   [WHERE $e_w$]
   [GROUP BY $p_g$ : $e_g$ [HAVING $e_h$]]
      [ORDER BY $e_o$]

where statements in [ ] are optional statements. In addition, $e_n$, . . . , $e_{fn}$, $e_s$, $e_w$, $e_g$ and $e_o$ are arbitrary expressions. In the FROM clause, each of $p_{f1}$ . . . $p_{fn}$ is a pattern, each of $e_{f1}$ . . . $e_{fn}$ is an expression that returns a sequence, a set or a map of key-value pair. The form "p in e" indicates that the pattern p matches every element in e with its pattern variables being bound to respective values in the elements. The form $p_g$:$e_g$ in the GROUP BY clause indicates that the query results are partitioned into groups so that the members of each group have the same value $e_g$, and the pattern $p_g$ is bound to the GROUP BY value that is common across each group.

In an optional embodiment of the present invention, the executing module 502 further comprises one or more of: a new variable setting module 507 configured to set a new query variable for associating to each SELECT expression in the query statement; a removing module 508 configured to remove all the join and filter predicates from the SQL query statement; and a replacing module 509 configured to replace the FROM part of each SELECT expression with a single binding that uses a tuple pattern to bind the query variables of directly nested SELECT expressions and variables of FROM part.

In an optional embodiment of the present invention, the executing module 502 conducts the search in parallel based on a MapReduce approach.

In an optional embodiment of the present invention, apparatus 500 may further comprise: an evaluating-selecting module 503 configured to, when there is more than one MapReduce approach for the search, evaluating the cost of every MapReduce approach and select a MapReduce approach with the minimum or least cost as an actual search way.

In an optional embodiment of the present invention, the executing module 502 further comprises one or more of: a job compressing module 510 configured to reduce I/O costs of reading input data from and writing output data MapReduce jobs; a horizontal combining module 511 configured to combine a plurality of MapReduce jobs that are independent of each other into a single MapReduce job; and a vertical combining module 512 configured to combine the pairs of product-consumer MapReduce jobs if at least one job of them is Map-only or both jobs share a same Map key.

In an optional embodiment of the present invention, the MapReduce approaches comprise an execution approach in the following form:

REPEAT v=e STEP body [limit n]

where v is a repetition variable, the type of e is a set {T} for a certain type T, the type of body is {(T, bool)}, and n is a natural number. The REPEAT statement further indicates that first v is bound to the value of e, then body is calculated repeatedly, and a new value is assigned to v from the previous repetition. The execution stops if either the number of repetitions becomes n or when all the Booleans returned by body are false.

Figure 6:
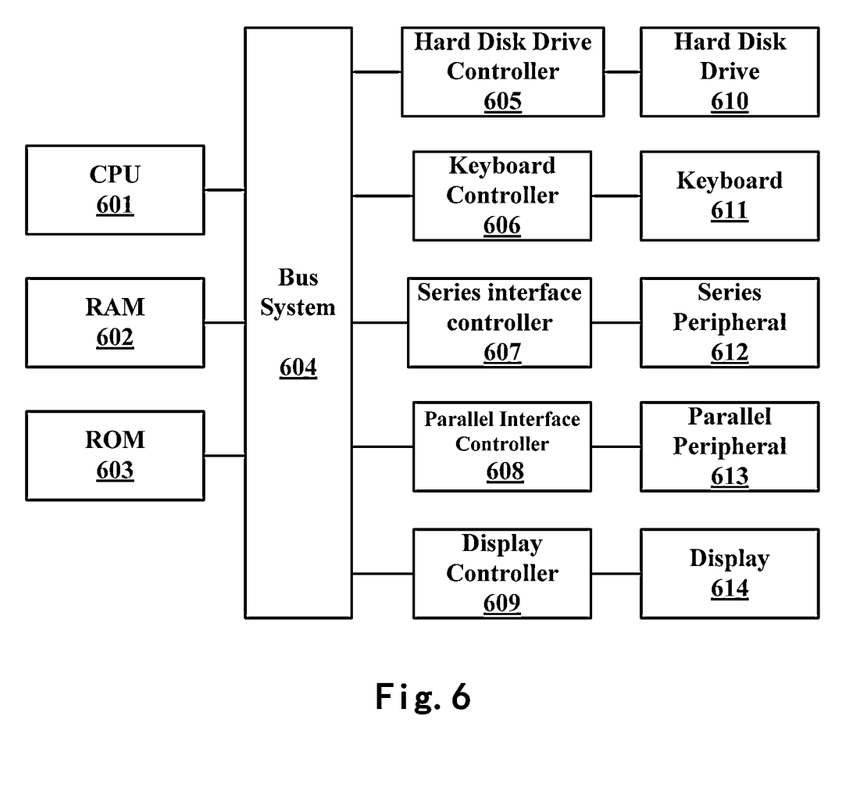
FIG. 6 shows a block diagram of an exemplary computer system 600 which is applicable to implement the embodiments of the present invention.

With reference to FIG. 6 below, this figure shows an exemplary block diagram of a computer system 600 which is applicable to implement the embodiments of the present invention. For example, computer system 600 shown in FIG. 6 may be used to implement various components of apparatus 500 for database search as described above or used to consolidate or implement various steps method 100 for database search as described above.

As shown in FIG. 6, the computer system may include: CPU (Central Process Unit) 601, RAM (Random Access Memory) 602, ROM (Read Only Memory) 603, System Bus 604, Hard Drive Controller 605, Keyboard Controller 606, Serial Interface Controller 607, Parallel Interface Controller 608, Display Controller 609, Hard Drive 610, Keyboard 611, Serial Peripheral Equipment 612, Parallel Peripheral Equipment 613 and Display 614. Among above devices, CPU 601, RAM 602, ROM 603, Hard Drive Controller 605, Keyboard Controller 606, Serial Interface Controller 607, Parallel Interface Controller 608 and Display Controller 609 are coupled to the System Bus 604. Hard Drive 610 is coupled to Hard Drive Controller 605. Keyboard 611 is coupled to Keyboard Controller 606. Serial Peripheral Equipment 612 is coupled to Serial Interface Controller 607. Parallel Peripheral Equipment 613 is coupled to Parallel Interface Controller 608. And, Display 614 is coupled to Display Controller 609. It should be understood that the structure as shown in FIG. 5 is only for the exemplary purpose rather than any limitation to the present invention. In some cases, some devices may be added to or removed based on specific situations.

As described above, apparatus 400 may be implemented as pure hardware, such as chips, ASIC, SOC, etc. The hardware elements may be integrated on computer system 600. In addition, embodiments of the present invention may further be implemented in the form of a computer program product. For example, method 100 that has been described with reference to FIG. 1 may be implemented by a computer program product. The computer program product may be stored in RAM 602, ROM 603, Hard Drive 610 as shown in FIG. 6 and/or any appropriate storage media, or be downloaded to computer system 600 from an appropriate location via a network. The computer program product may include a computer code portion that comprises program instructions executable by an appropriate processing device (e.g., CPU 501 shown in FIG. 6). The program instructions at least may comprise program instructions used for executing the steps of method 100.

The spirit and principles of the present invention have been set forth above in conjunction with several embodiments. The method and apparatus for database search according to embodiments of the present invention boasts a number of advantages over the prior art. For example, by extending SQL and optimizing the associated query framework in the database, the present disclosure can efficiently and effectively resolve the issues that are common to the existing MapReduce query processing systems (i.e. limited query expressive power and restricted query optimization ability), thereby being particularly suitable for big dataset analytics in large cluster systems.

Specifically, a novel declarative processing system presented in the present disclosure utilizes MapReduce as the underneath Big Data analysis engine. Several extensions are proposed to SQL so that the extended-SQL is expressive enough to capture most common data computation tasks in a declarative form and thus almost eliminates the need for plugging handcrafted MapReduce code in order to achieve computationally completeness. Further, the extended-SQL has the following attractive features: it allows nested queries and user-defined functions (UDF) anywhere; it allows operations over the grouped data; it supports custom filters/aggregations as UDFs; it supports declarative recursions. The present disclosure also provides a corresponding query optimization framework that efficiently translates declarative queries written with the extended-SQL to optimal workflows of MapReduce jobs. The query optimizer in the present disclosure is cost-based, leveraging on the existing relational query optimization technologies as well as exploiting the usage and design properties of MapReduce frameworks.

Note the embodiments of the present invention can be implemented in hardware, software or combination of software and hardware. The hardware portion can be implemented by using dedicated logic; the software portion can be stored in a memory and executed by an appropriate instruction executing system such as a microprocessor or dedicated design hardware. Those of ordinary skill in the art may appreciate the above system and method can be implemented by using computer-executable instructions and/or by being contained in processor-controlled code, which is provided on carrier media like a magnetic disk, CD or DVD-ROM, programmable memories like a read-only memory (firmware), or data carriers like an optical or electronic signal carrier. The system of the present invention can be embodied as semiconductors like very large scale integrated circuits or gate arrays, logic chips and transistors, or hardware circuitry of programmable hardware devices like field programmable gate arrays and programmable logic devices, or software executable by various types of processors, or a combination of the above hardware circuits and software, such as firmware.

The communication network mentioned in this specification may include various types of network, including without limitation to a local area network ("LAN"), a wide area network ("WAN"), a network according to IP (e.g. Internet), and an end-to-end network (e.g. ad hoc peer-to-peer network).

Note although several means or submeans of the device have been mentioned in the above detailed description, such division is merely exemplary and not mandatory. In fact, according to the embodiments of the present invention, the features and functions of two or more means described above may be embodied in one means. On the contrary, the features and functions of one means described above may be embodied by a plurality of means.

In addition, although operations of the method of the present disclosure are described in specific order in the figures, this does not require or suggest these operations be necessarily executed according to the specific order, or all operations be executed before achieving a desired result. On the contrary, the steps depicted in the flowchart may change their execution order. Additionally or alternatively, some steps may be removed, multiple steps may be combined into one step, and/or one step may be decomposed into multiple steps.

Although the present invention has been described with reference to several embodiments, it is to be understood the present disclosure is not limited to the embodiments disclosed herein. The present disclosure is intended to embrace various modifications and equivalent arrangements comprised in the spirit and scope of the appended claims. The scope of the appended claims accords with the broadest interpretation, thereby embracing all such modifications and equivalent structures and functions.

The invention claimed is:

1. A method for database search, comprising:
grouping data entries based on join conditions between the data entries as set in search conditions;
implementing the search conditions using an extended-SQL query, wherein the extended SQL query is enabled to include nested queries;
creating a query graph based on the grouping of data entries and the extended-SQL query, wherein a node in the query graph represents a query variable in the extended-SQL query and an edge between nodes in the query graph represents a joint condition between query variables;
creating, based on the query graph, a query header derived from the extended-SQL query;
analyzing the data entries to determine whether multiple MapReduces are enabled to be used to search;
executing the search based on the grouping of the data entries and the query graph; and
transforming the search conditions by removing patterns.

2. The method according to claim 1, further comprises transforming the search conditions by at least one of:
rewriting rules and eliminating nests.

3. The method according to claim 1, wherein the step of grouping is implemented further based on dependences between at least one of values of the data entries as set in the search conditions or types of the data entries as set in the search conditions.

4. The method according to claim 3, wherein the search conditions comprise at least an SQL query statement.

5. The method according to claim 3, wherein the at least one of the values and types of the data entries in a database comprise at least one of:
record type $<A1:t1, \ldots, An:tn>$, sequence type $[t]$, set type $\{t\}$, and map type $\{(t1, t2)\}$; where n is a natural number, $t, t1, \ldots, tn$ are recursively defined types, $A1, \ldots, An$ are component names, and map type $\{(t1, t2)\}$ binds keys of type $t1$ to values of type $t2$.

6. The method according to claim 4, wherein the SQL query statement comprises the following forms:

SELECT [DISTINCT] $e_s$
FROM $p_{f1}$ in $e_{f1}, \ldots, p_{fn}$ in $e_{fn}$

-continued

```
[WHERE e_w]
[GROUP BY p_g : e_g [HAVING e_h]]
[ORDER BY e_o]
``` where statements in [ ] are optional statements; and where $e_{f1}, \ldots, e_{fn}, e_s, e_w, e_g$ and $e_0$ are arbitrary expressions; and in the FROM clause each of $p_{f1} \ldots p_{fn}$ is a pattern, each of $e_{f1} \ldots e_{fn}$ is an expression that returns a sequence, a set or a map of key-value pair; the form "p in e" indicating that the pattern p matches every element in e with its pattern variables being bound to respective values in the elements; the form $p_g:e_g$ in a GROUP BY clause indicating that query results are partitioned into groups so that members of each group have the same value $e_g$, and the pattern $p_g$ is bound to the GROUP BY value that is common across each group.

7. The method according to claim 6, wherein executing the search based on the grouping of the data entries further comprises at least one of:
  setting a new query variable for associating to each SELECT expression in the query statement;
  removing all the join conditions and filter predicates from the SQL query statement; and
  replacing the FROM part of each SELECT expression with a single binding that uses a tuple pattern to bind the query variables of directly nested SELECT expressions and variables of FROM part.

8. The method according to claim 1, wherein the search is implemented in parallel based on MapReduce.

9. The method according to claim 8, wherein the cost of every MapReduce is evaluated and a MapReduce with the minimum cost is selected for performing the search.

10. The method according to claim 8, wherein the MapReduce comprises at least one of:
  reducing I/O costs of reading input data and writing output data by MapReduce jobs;
  combining a plurality of MapReduce jobs that are independent of each other into a single MapReduce job; and
  combining the pairs of product-consumer MapReduce jobs if at least one job is Map-only or both jobs share a same Map key.

11. The method according to claim 8, wherein the MapReduce comprises an execution approach in the following form:
  REPEAT v=e STEP body [limit n]
where v is a repetition variable, the type of e is a set {T} for a certain type T, the type of body is {(T, bool)}, and n is a natural number; and where the REPEAT statement indicates that first v is bound to the value of e, then calculate body repeatedly, and a new value is assigned to v from the previous repetition; the execution stops if either the number of repetitions becomes n or when all the Booleans returned by body are false.

12. An apparatus for database search, comprising: a module configured to group data entries based on join conditions between the data entries as set in search conditions, wherein the module implements the search conditions using an extended-SQL query, wherein the extended SQL query is enabled to include nested queries, wherein the module is enabled to analyze the data entries to determine whether multiple MapReduces are enabled to be used to search; wherein the module is enabled to create a query graph based on the grouping of data entries and the extended-SQL query, wherein a node in the query graph represents a query variable in the extended-SQL query and an edge between nodes in the query graph represents a join condition between query variables and create, based on the query graph, a query header derived from the extended-SQL query; execute the search based on the grouping of the data entries and the query graph; and
  a pattern removing module configured to remove patterns from the search conditions.

13. The apparatus as claimed in claim 12, wherein the module comprises a grouping module to group data entries and an executing module to execute the search.

14. The apparatus according to claim 12, wherein at least one of the module and the grouping module further comprises at least one of the followings to transform the search conditions:
  a query simplifying module configured to rewrite rules; and
  a nest eliminating module configured to eliminate nests.

15. The apparatus according to claim 12, wherein the grouping module implements the grouping further based on dependences between at least one value of the data entries as set in the search conditions of types of the data entries as set in the search conditions, wherein types of the data entries in the database comprise one of: record type <A1:t1, . . . , An:tn>, sequence type [t], set type {t}, and map type {(t1, t2)}; where n is a natural number, t, t1, . . . , tn are recursively defined types, A1, . . . , An are component names, and map type {(t1, t2)} binds keys of type t1 to values of type t2.

16. The apparatus according to claim 12, wherein the search conditions comprise at least an SQL query statement wherein the SQL query statement comprises the following forms:

```
SELECT [DISTINCT] e_s
FROM p_{f1} in e_{f1}, ..., p_{fn} in e_{fn}
[WHERE e_w]
[GROUP BY p_g : e_g [HAVING e_h]]
[ORDER BY e_o]
``` where statements in [ ] are optional statements; and where $e_{f1}, \ldots, e_{fn}, e_s, e_w, e_g$ and $e_0$ are arbitrary expressions; and in the FROM clause each of $p_{f1} \ldots p_{fn}$ is a pattern, each of $e_{f1} \ldots e_{fn}$ is an expression that returns a sequence, a set or a map of key-value pair; the form "p in e" indicating that the pattern p matches every element in e with its pattern variables being bound to respective values in the elements; the form $p_g:e_g$ in a GROUP BY clause indicating that query results are partitioned into groups so that members of each group have the same value $e_g$, and the pattern $p_g$ is bound to the GROUP BY value that is common across each group.

17. The apparatus according to claim 12, wherein the executing module further comprises at least one of:
  a new variable setting module configured to set a new query variable for associating to each SELECT expression in the query statement;
  a removing module configured to remove all the join conditions and filter predicates from the SQL query statement; and
  a replacing module configured to replace the FROM part of each SELECT expression with a single binding that uses a tuple pattern to bind the query variables of directly nested SELECT expressions and variables of FROM part.

18. The apparatus according to claim 12, wherein the executing module implements the search in parallel based on a MapReduce, and wherein an evaluating-selecting module is configured to evaluate the cost of every MapReduce and select a MapReduce with the minimum cost for performing the search.

19. The apparatus according to claim 18, wherein the executing module further comprises at least one of:
- a job compressing module configured to reduce I/O costs of reading input data and writing output data by MapReduce jobs;
- a horizontal combining module configured to combine a plurality of MapReduce jobs that are independent of each other into a single MapReduce job; and
- a vertical combining module configured to combine pairs of product-consumer MapReduce jobs if at least one job is Map-only or both jobs share a same Map key.

20. The apparatus according to claim 18, wherein the MapReduce comprises an execution approach in the following form:

REPEAT v=e STEP body [limit n]

where v is a repetition variable, the type of e is a set $\{T\}$ for a certain type T, the type of body is $\{(T, bool)\}$, and n is a natural number; and where the REPEAT statement indicates that first v is bound to the value of e, then calculate body repeatedly, and a new value is assigned to v from the previous repetition; the execution stops if either the number of repetitions becomes n or when all the Booleans returned by body are false.

* * * * *